United States Patent
Dakka et al.

(10) Patent No.: US 9,594,955 B2
(45) Date of Patent: Mar. 14, 2017

(54) MODIFIED WALLIS FILTER FOR IMPROVING THE LOCAL CONTRAST OF GIS RELATED IMAGES

(71) Applicant: Rolta India Ltd, Mumbai (IN)

(72) Inventors: Ravi Sankar Dakka, Hyderabad (IN); Ravindra N Kondekar, Mumbai (IN); Laxmidhar V Gaopande, Mumbai (IN)

(73) Assignee: ROLTA INDIA LTD (IN)

( * ) Notice: Subject to any disclaimer, the term of this patent is extended or adjusted under 35 U.S.C. 154(b) by 273 days.

(21) Appl. No.: 14/272,529

(22) Filed: May 8, 2014

(65) Prior Publication Data

US 2015/0324641 A1  Nov. 12, 2015

(51) Int. Cl.
G06K 9/00 (2006.01)
G06T 5/00 (2006.01)
G06K 9/52 (2006.01)
G06K 9/46 (2006.01)
G06T 7/40 (2006.01)

(52) U.S. Cl.
CPC ....... *G06K 9/00476* (2013.01); *G06K 9/4652* (2013.01); *G06K 9/52* (2013.01); *G06T 5/00* (2013.01); *G06T 7/408* (2013.01)

(58) Field of Classification Search
None
See application file for complete search history.

(56) References Cited

U.S. PATENT DOCUMENTS

2013/0022241 A1 * 1/2013 Goodman ............... G01S 17/87
382/103

* cited by examiner

Primary Examiner — Weiwen Yang
(74) Attorney, Agent, or Firm — Enterprise IP

(57) ABSTRACT

Disclosed herein is a method and system for performing adaptive local contrast enhancement for an image by using a linear complexity algorithm for Wallis filter. For an input image, the standard deviation and mean are computed for the first pixel in the image. The computed standard deviation and mean of the first pixel are re-used to calculate the standard deviation and mean for the nearest pixels. So, the standard deviation and mean for each pixel in the image are based on the computed standard deviation and mean of at least one other pixel in the image.

12 Claims, 11 Drawing Sheets

MODIFIED WALLIS FILTER FOR IMPROVING THE LOCAL CONTRAST OF GIS RELATED IMAGES

TECHNICAL FIELD

The embodiments herein relate to GIS (Geographic Information Systems) images and, more particularly, to enhancing the local contrast of GIS images.

BACKGROUND

Wallis filter is a filter used in image processing for improving the local contrast in an image. The Wallis Filter adjusts brightness values in local areas of the image, such that good local contrast is generated throughout the image, while reducing the overall contrast between bright and dark areas. This ensures that the displayed pixels are in the visible range and saturation (if any) is removed from the image.

For each pixel $G_{in}$ (grey value of the input pixel) in an image, $G_{out}$ (grey value of the output pixel) is calculated using the following formula:

$$G_{out}=M_{out}*Fac+M_{in}*(1-Fac)+(G_{in}-M_{in})*S_{out}/S_{in}$$

where, $M_{in}$ is mean grey value of the neighborhood (wherein the neighborhood is as defined by window size, W) around the input pixel, $S_{in}$ is standard deviation of the grey value of the neighborhood (as defined by window size, W) around the input pixel, $M_{out}$ is desired mean grey value of the output pixel neighborhood, $S_{out}$ is desired standard deviation grey value of the output pixel neighborhood and Fac is factor for desired mean.

The approximate range of values may be as follows:
$M_{out}$=100 on scale of 0 to 255;
$S_{out}$=50 on scale of 0 to 255;
Gain Limit ($S_{out}/S_{in}$)=7 (<7);
Fac=1 (0.0–1.0)
W=19 to 99 (ideally, W>49)

For each pixel in the image, the mean of the surrounding Wallis window region (W) with complexity $O(W*W)$ is computed. The standard deviation in the surrounding Wallis window region is further computed with complexity $O(W*W)$. $G_{out}$ is computed based on $G_{in}$, $M_{in}$ and $S_{in}$. Time complexity of the above traditional algorithm is $O(n*W*W)$, where n is the number of pixels in the image, W is the Wallis window size. Standard deviation (s) is calculated using the formula given below:

$$s_N = \sqrt{\frac{1}{N}\sum_{i=1}^{N}(x_i-\bar{x})^2},$$

where $x_i$ represents the pixel value and $\bar{x}$ represents the mean.

The above traditional Wallis algorithm is computationally very intensive, as the above mentioned steps have to be repeated for every pixel in the image. Also, the level of computation increases with an increase in W, whereas a high value of W improves the results further. Hence, use of a standard Wallis filter may not be suitable for real time panning (roaming) GIS applications, as applying Wallis filter takes a long time when panning an image, resulting sticky roam behaviour.

Currently, there are solutions which use intensive computing power (such as a specialized graphics card) to enable application of Wallis filters in real time panning GIS applications. However, the equipment costs prove to be very expensive and these solutions do not reduce the computation intensive nature of the Wallis filter.

BRIEF DESCRIPTION OF THE FIGURES

The embodiments herein will be better understood from the following detailed description with reference to the drawings, in which.

DETAILED DESCRIPTION OF EMBODIMENTS

Figure 1A:
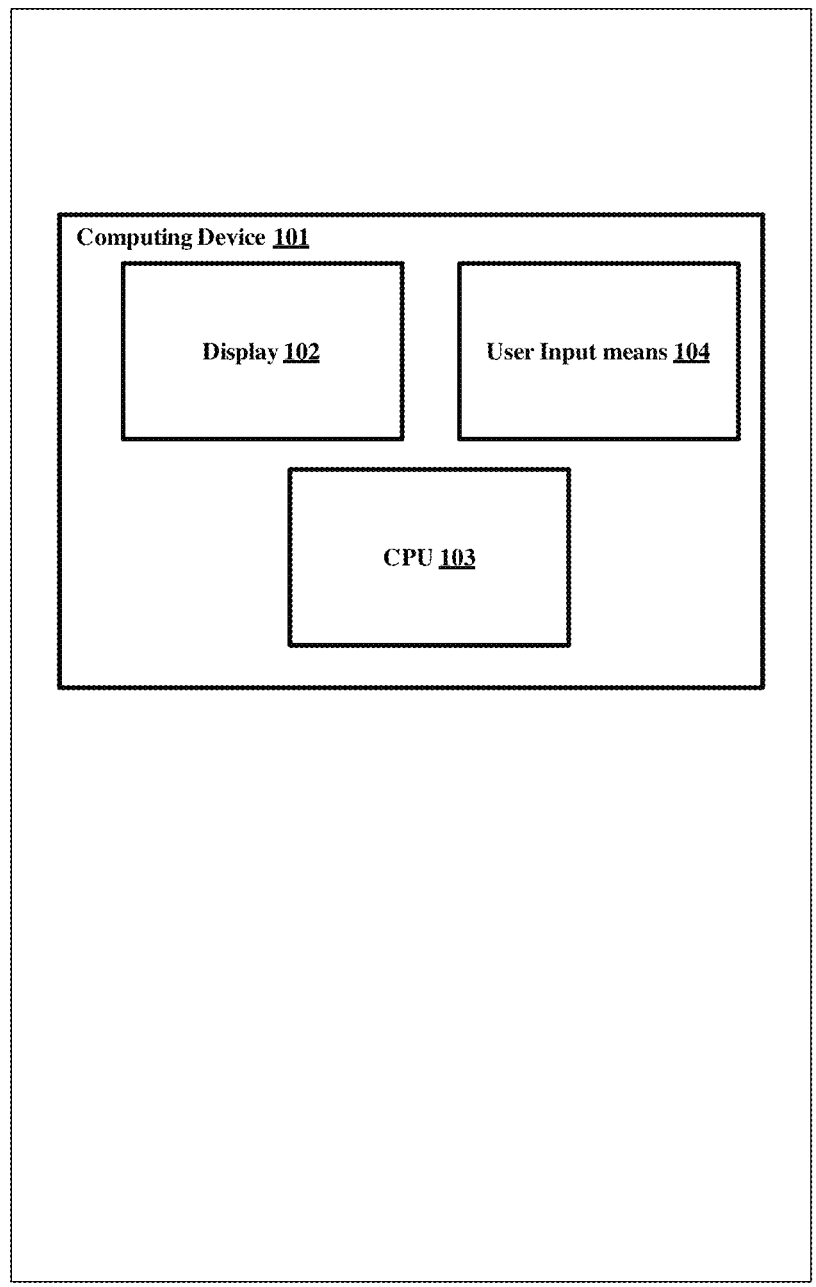
FIG. 1a illustrates a computing device comprising of a GIS application, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for performing adaptive local contrast enhancement for an image by using a linear complexity algorithm for Wallis filter. Referring now to the drawings, and more particularly to FIGS. 1 through 7, where similar reference characters denote corresponding features consistently throughout the figures, there are shown embodiments.

FIG. 1a illustrates a computing device comprising of a GIS application, according to embodiments as disclosed herein. The computing device 101, as depicted, comprises of a display 102, a user input means 104 and a CPU (Central Processing Unit) 103. The computing device 101 may be at least one of a desktop computer, a laptop, a tablet, a smart phone, a mobile phone or any other device capable of accessing the GIS application. The display 102 may enable a user of the computing device 101 to view information. The display 102 may be a monitor, a separate display device connected to the other components of the computing device 101 using a cable/wire, an integrated display present in the body of the computing device 101 and so on. In an embodiment herein, the display 102 may comprise of more than one display devices. The user input means 104 may enable the user of the computing device 101 to interact with the computing device 101. The user input means 104 may comprise of at least one of a physical keyboard, a mouse, a touchpad, a joystick, an on-screen keyboard, a touchscreen and so on. The user may use more than one user input means 104 at a time to interact with the computing device 101. The CPU 103 comprises of a computing means enabling the computing device 101 to perform computing functions. The CPU 103 may be a separate device connected to the display 102 and the user input means 104 using a suitable means such as cable/wires and so on. The CPU 103 may be integrated with at least one of the display 102 and the user input means 104. The CPU 103 enables the user to access and perform a plurality of operations on the GIS application. The GIS application may be a browser based application (web application), which may be accessed by the user using a browser present on the computing device 101. The GIS application may be a stand-alone GUI (Graphical User Interface) based application resident on the computing device 101, which the user may access directly using the computing device 101.

Figure 1B:
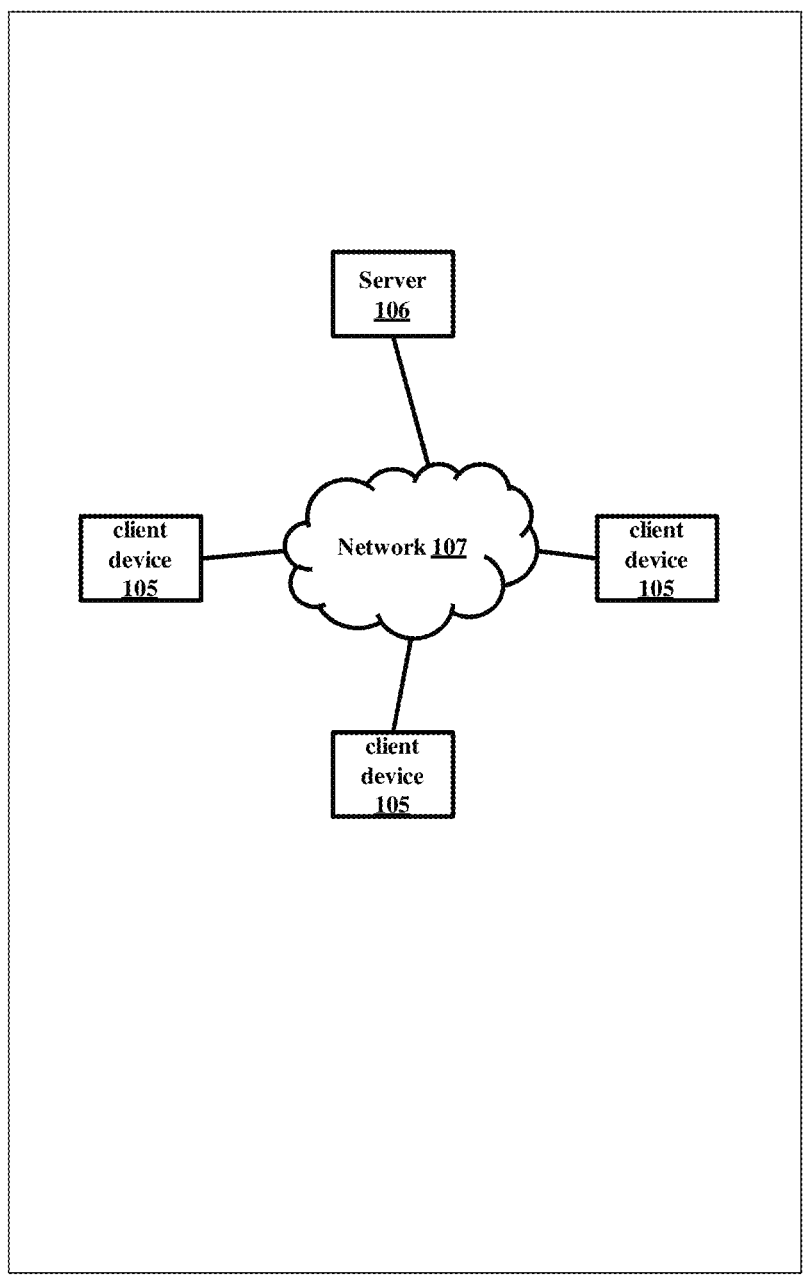
FIG. 1b illustrates a system comprising of plurality of clients connected to a server through a network, wherein the network enables the client to access the GIS application present on the server, according to embodiments as disclosed herein.

FIG. 1*b* illustrates a system comprising of plurality of clients connected to a server through a network, wherein the network enables the client to access the GIS application present on the server, according to embodiments as disclosed herein. The system comprises of a plurality of client devices 105 connected to at least one server 106 through a network 107. The client device 105 may be at least one of a desktop computer, a laptop, a tablet, a smart phone, a mobile phone or any other device capable of accessing the GIS application using the network 107. The network 107 may be at least one of the internet, a LAN (Local Area Network), a WAN (Wide Area Network) and so on, which may enable a plurality of client devices 105 to access the GIS application resident on the server 106. The GIS application may be a browser based application (web application), which may be accessed by the user from the server 106 using a browser present on the client device 105. The GIS application may be a stand-alone GUI (Graphical User Interface) based application, which the user may access directly using the client device 105.

Figure 1C:
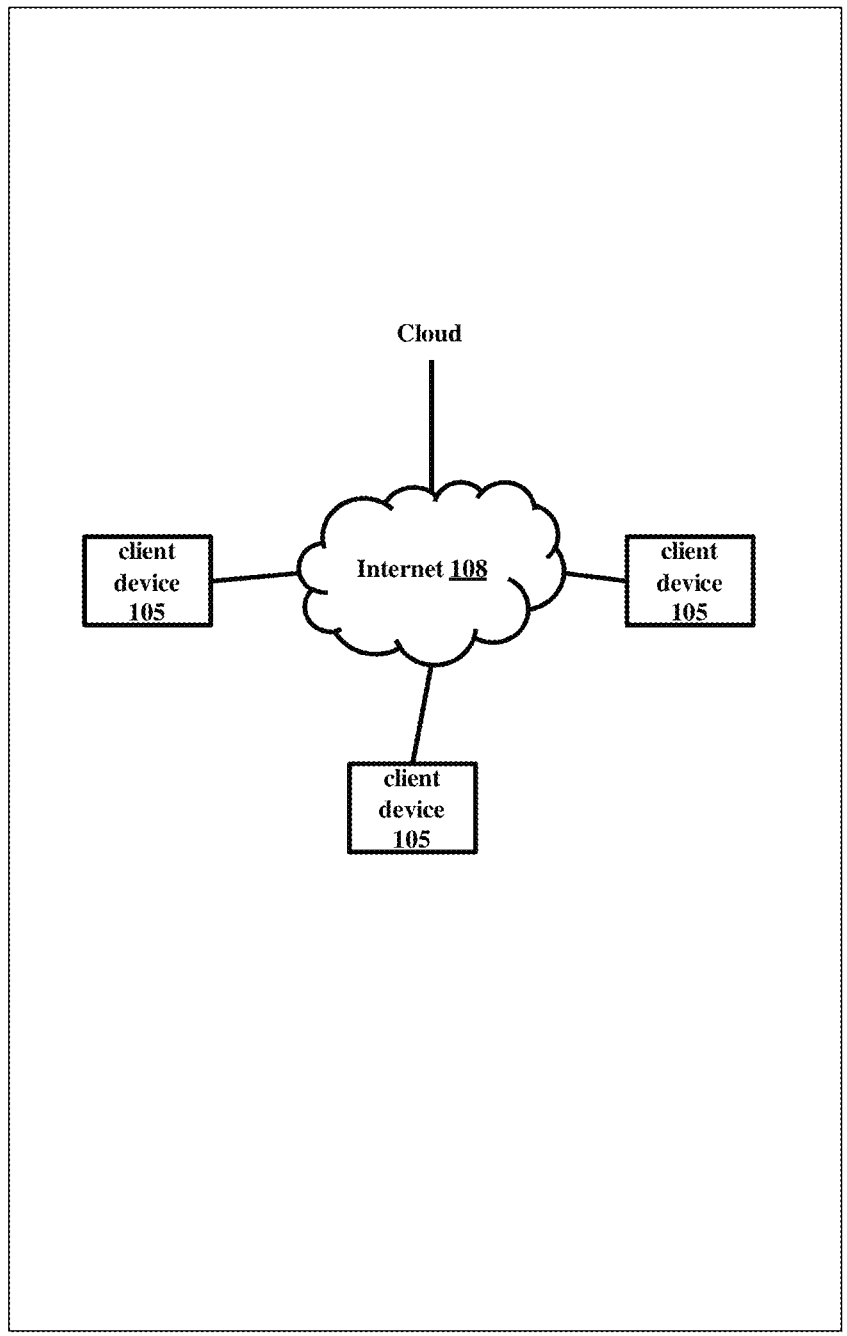
FIG. 1c illustrates a plurality of clients connected to the cloud, wherein the network enables the client to access the GIS application present on the cloud, according to embodiments as disclosed herein.

FIG. 1*c* illustrates a plurality of clients connected to the cloud, wherein the internet enables the client to access the GIS application present on the cloud, according to embodiments as disclosed herein. FIG. 1*c* depicts a plurality of client devices 105 connected to the cloud through the internet 108. The client device 105 may be at least one of a desktop computer, a laptop, a tablet, a smart phone, a mobile phone or any other device capable of accessing the GIS application using the network 107. The client device 105 may access the GIS application through the cloud. The GIS application may be a browser based application (web application), which may be accessed by the user from cloud using a browser present on the client device 105. The GIS application may be a stand-alone GUI (Graphical User Interface) based application, which the user may access directly using the client device 105.

Figure 2:
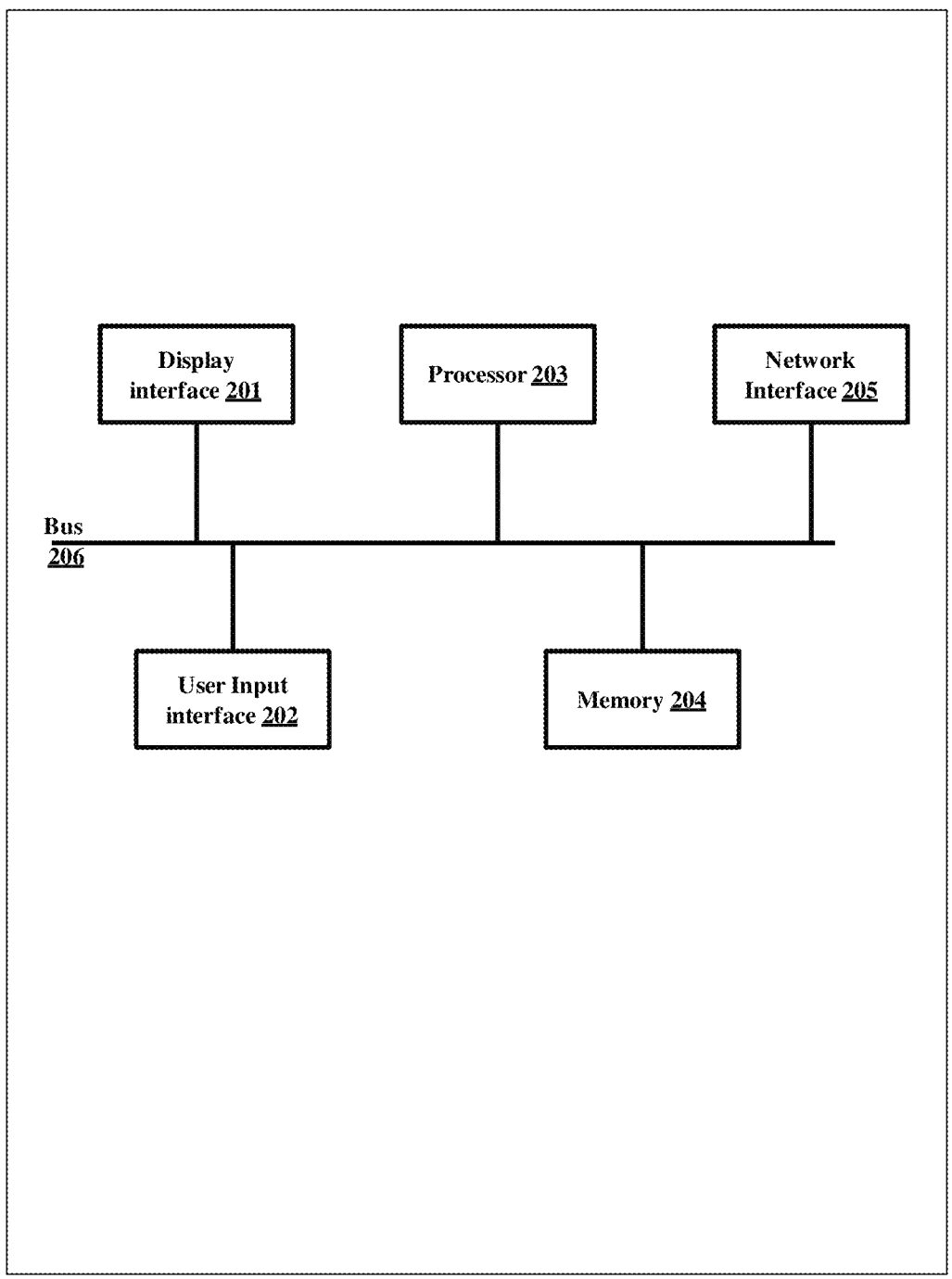
FIG. 2 depicts the computing device comprising of the GIS application, according to embodiments as disclosed herein.

FIG. 2 depicts the computing device comprising of the GIS application, according to embodiments as disclosed herein. The figure depicts a CPU 103 containing a display interface 201, a user input interface 202, a processor 203, a memory 204 and a network interface 205 and a bus 206. The display interface 201 enables the CPU 103 to communicate with the display 102. The display interface 201 may comprise of the drivers required for the CPU 103 to communicate with the display 102 and at least one physical port and/or connector which connects the CPU 103 to the display 102. In an embodiment herein, the display interface 201 may enable the CPU to communicate with a plurality of displays 102. The user input interface 202 enables the CPU 103 to communicate with the user input means 103. The user input interface 202 may comprise of the drivers required for the CPU 103 to communicate with the user input means 104 and at least one physical port and/or connector which connects the CPU 103 to the user input means 104. The processor 203 may be configured to enable a plurality of applications resident on the CPU to be executed. Examples of the applications may be a browser, a standalone GUI based application and so on. The memory 204 may comprise of a volatile memory and a non-volatile memory. The memory 204 may be configured applications, data related to the applications and so on. The memory 204 may configured to make the applications and/or data available, on receiving a request from the processor 203. The network interface 204 may enable the CPU 103 to interface with at least one network. The network may be at least one of the internet, a LAN (Local Area Network), a WAN (Wide Area Network) and so on. The network interface 205 may comprise of the drivers required for the CPU 103 to communicate with the network and at least one physical port and/or connector which connects the CPU 103 to the network. The bus 206 connects the above mentioned components and enables the above mentioned components to communicate with each other.

Figure 3:
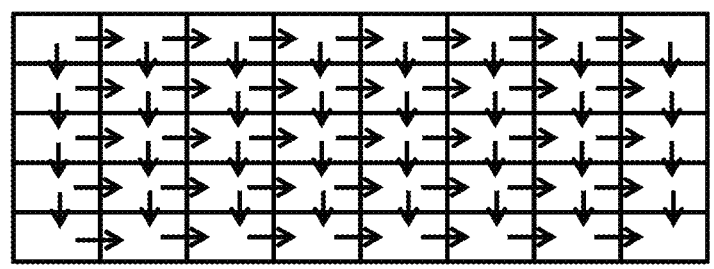
FIG. 3 depicts an image comprising of a plurality of pixels, wherein the computed standard deviation and mean of the first pixel are re-used for the nearest pixels, according to embodiments as disclosed herein.

For an input image, the CPU 103 computes the standard deviation and mean for the first pixel in the image. The CPU 103 re-uses the computed standard deviation and mean of the first pixel for the nearest pixels. So, the standard deviation and mean for each pixel in the image are based on the computed standard deviation and mean of at least one other pixel in the image (as depicted in FIG. 3, wherein each block represents a pixel).

Figure 4:
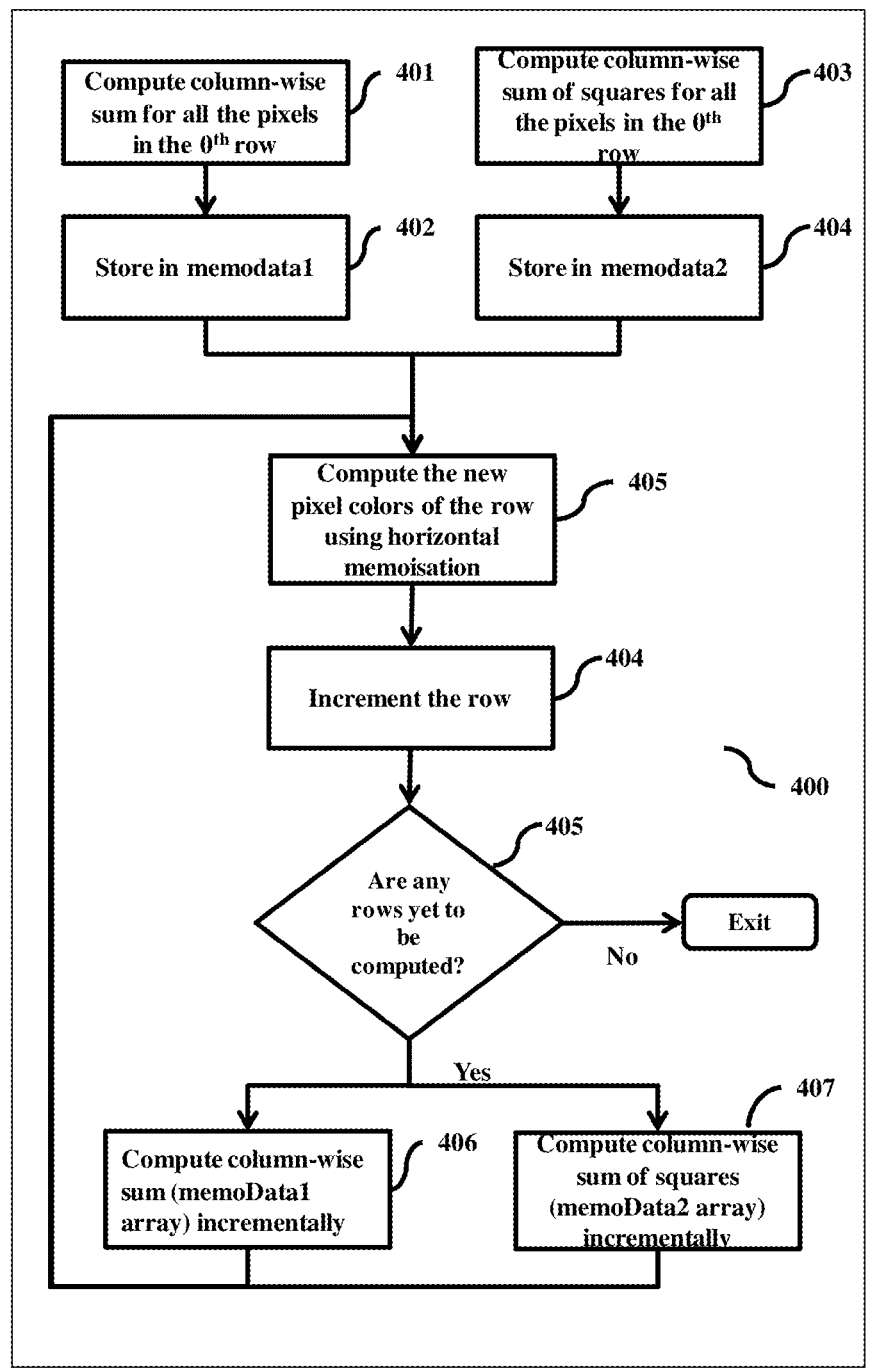
FIG. 4 is a flowchart illustrating the process of applying a modified Wallis filter to an image, according to embodiments as disclosed herein.
Figure 6:
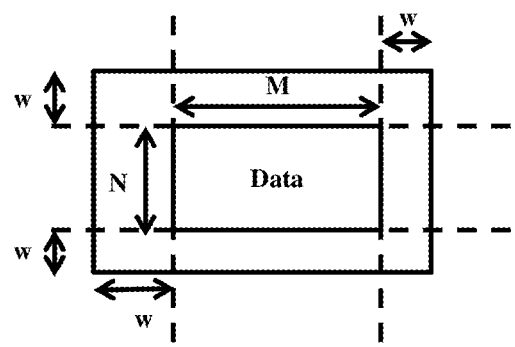
FIG. 6 depicts a data from the image with a border around the data, according to embodiments as disclosed herein.
Figure 7A:
FIGS. 7a and 7b depict an image before and after applying the Wallis filter respectively, according to embodiments as disclosed herein.

FIG. 4 is a flowchart illustrating the process of applying a modified Wallis filter to an image, according to embodiments as disclosed herein. Consider an image comprising of a plurality of pixels (as depicted in FIG. 7*a*). A border of w=(W−1)/2 pixels around the pixel being considered, where W is the Wallis windows size. In an embodiment herein, W is odd. If the data is M by N with a border of w around the data, the total data size may be (M+2w) by (N+2w) (as depicted in FIG. 6). The CPU 103 computes (401) column-wise sum for all the pixels in the $0^{th}$ row up to the extent of the Wallis window and stores (402) the computed column-wise sum for all the pixels in memodata1. Memodata1 is an array of (M+2w) and comprises of column wise sum of pixel values. Memodata1 for the rth row may be calculated as $$\text{Memodata1}[i] = sum(data[j][i]), j = r-w \text{ to } r+w \text{ and } i = 0 \text{ to } M+2w-1$$

The CPU 103 computes (403) column-wise sum of squares for all the pixels in the $0^{th}$ row up to the extent of the Wallis window and stores (404) the computed column-wise sum of squares for all the pixels in memodata2. Memodata2 is an array of (M+2w) and comprises of column wise sum of squares of pixel values. Memodata2 for the rth row may be calculated as Memodata1[i]=sum(sqr(data[j][i])),j=r−w to r+w and i=0 to M+2w−1

The CPU 103 further computes (405) the new pixel colours of the row using horizontal memoization. The CPU 103 further increments (406) the row and checks (407) if there are any further rows to be computed. If there are further rows to be computed, the CPU 103 computes (408) the column-wise sum (memodata1) incrementally. The CPU 103 may compute the column-wise sum by removing the top most row of previous row window from the memoization and adding the new row (which is the last row of the wallis window of the current row) into the memoization. Memodata1 for the (r+1)th row may be calculated as Memodata1[i]=Memodata1[i]−data[j][r−w]+data[j][r+w+1]

where i=0 to M+2w−1.

The CPU 103 further computes (409) the column-wise sum of squares (memodata2) incrementally. The CPU 103 may compute the column-wise sum by removing the top most row of previous row window from the memoization and adding the new row (which is the last row of wallis window of the current row) into the memoization. Memodata2 for the rth row may be calculated as Memodata1[i]=sum(sqr(data[j][i])),j=r−w to r+w and i=0 to M+2w−1

Figure 7B:
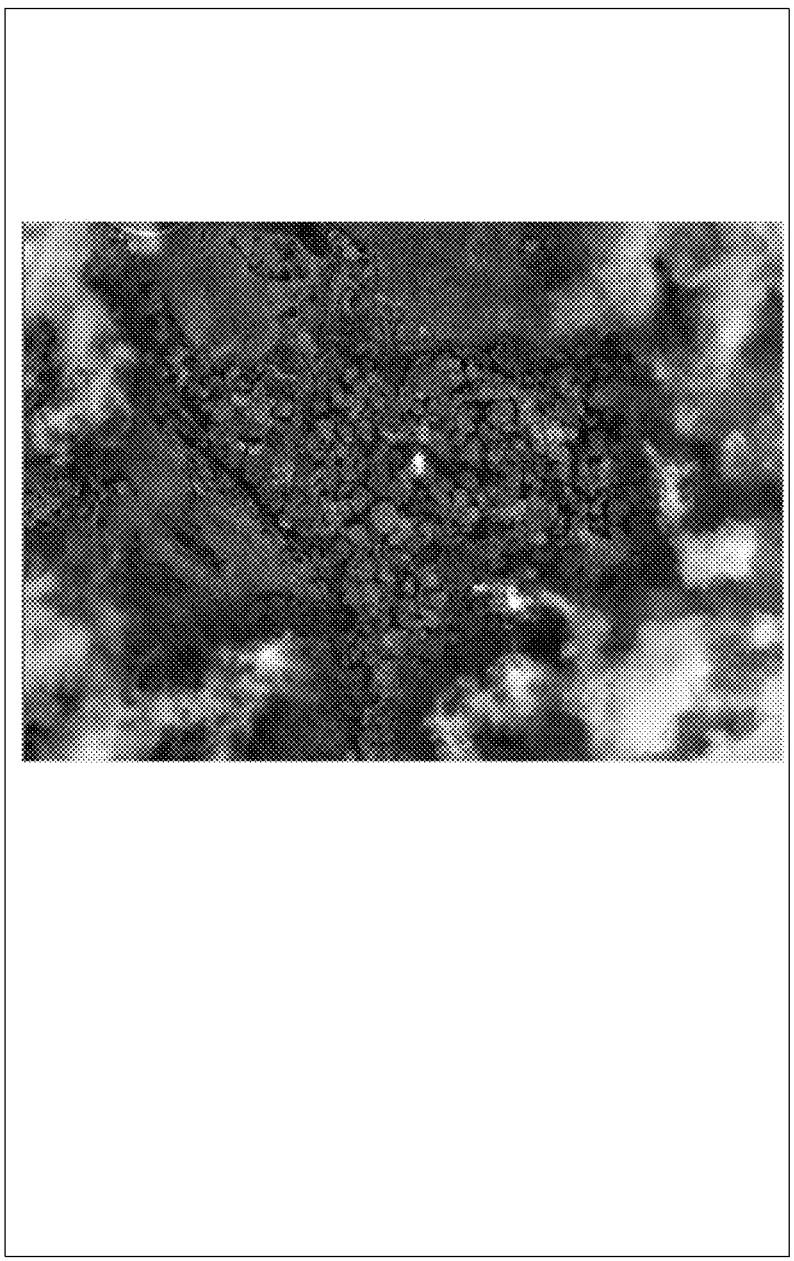

The resulting image may appear as depicted in FIG. 7*b*. The various actions in method 400 may be performed in the order presented, in a different order or simultaneously. Further, in some embodiments, some actions listed in FIG. 4 may be omitted.

Figure 5A:
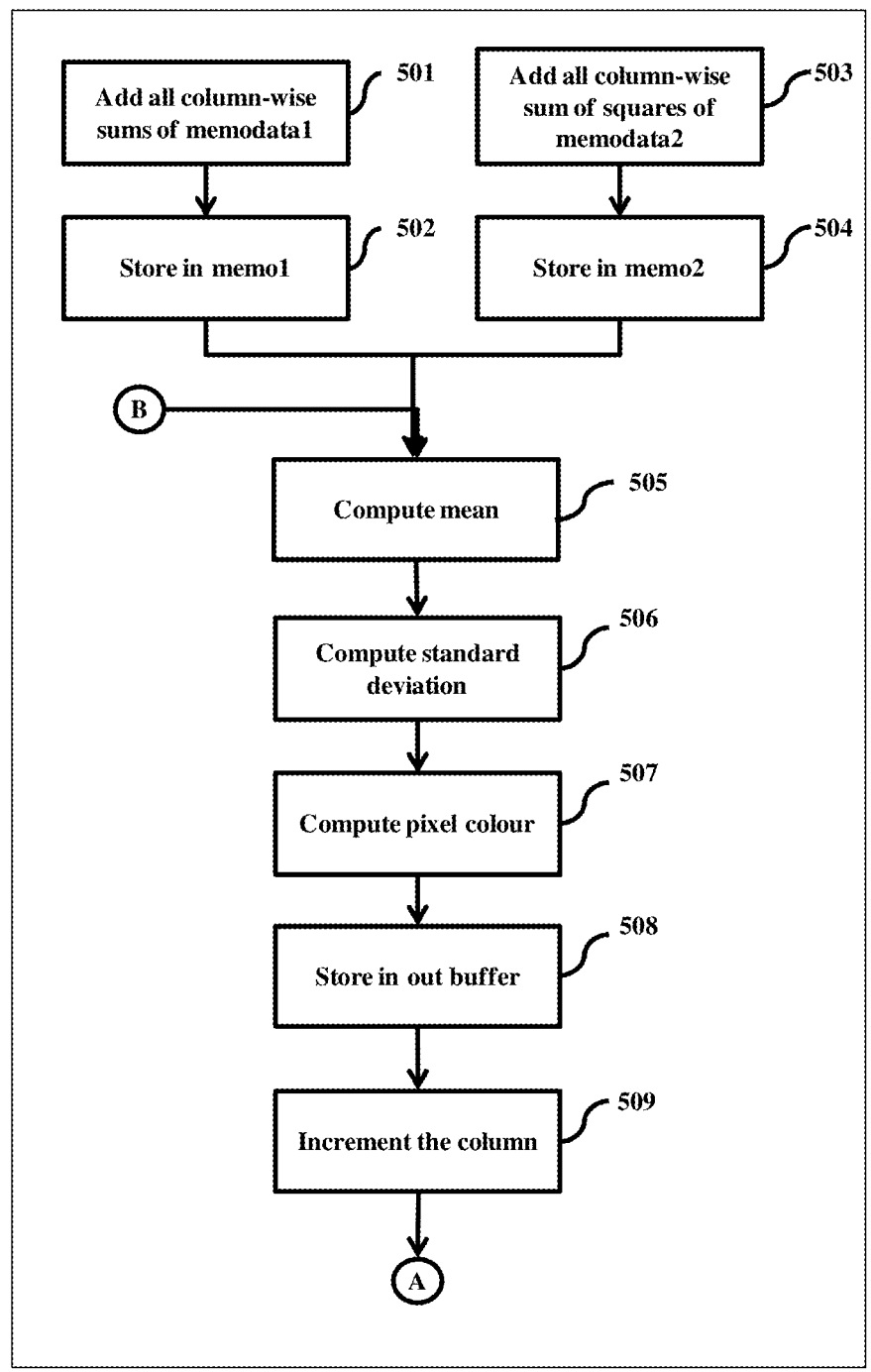
FIGS. 5a and 5b is a flowchart illustrating the process of computing the new pixel colours of the row using horizontal memoization, according to embodiments as disclosed herein.
Figure 5B:
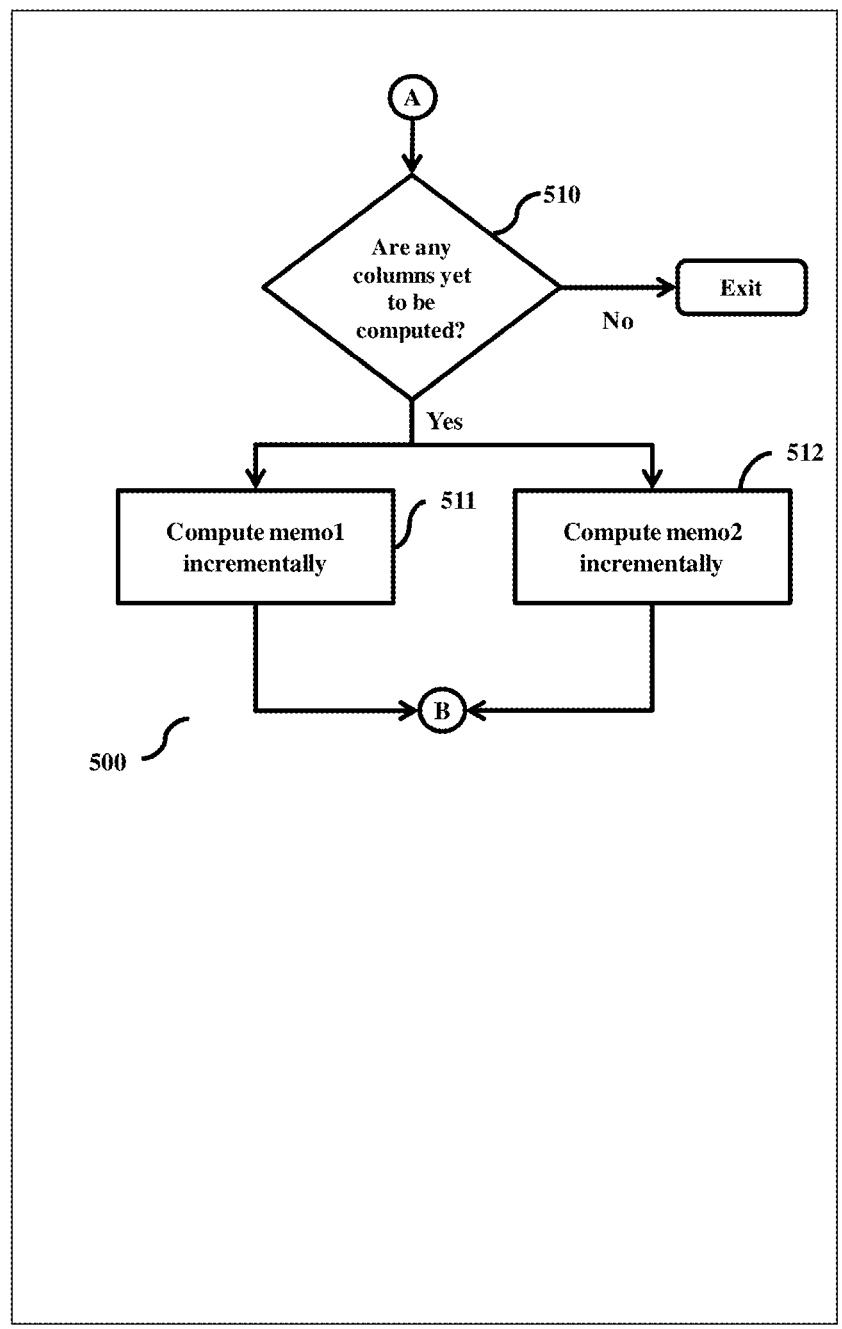

FIGS. 5*a* and 5*b* is a flowchart illustrating the process of computing the new pixel colours of the row using horizontal memoization, according to embodiments as disclosed herein. The CPU 103 adds (501) all the column-wise sums of memodata1 up to the extent of the Wallis window to obtain the total Wallis sum and stores (502) the total Wallis sum in memo1. The CPU 103 adds (503) all the column-wise sums of squares of memodata2 up to the extent of the Wallis window to obtain the total Wallis sum of squares and stores (504) the total Wallis sum of squares in memo2. Memo1 and Memo2 may be initialized to zero, before the computed values are stored. The CPU 103 further computes (505) the mean as Mean=memo1/Window size The CPU 103 computes (506) the standard deviation as StdDev=Sqrt((memo2−mean*mean*WindowSize)/(WindowSize−1))

The CPU 103 computes (507) the pixel colour using Wallis formula as

Color(Row, Col)=Wallis(mean, StdDev, Color(Row, Col))

The CPU 103 then stores (508) the computed pixel colour in an out buffer. The CPU 103 further increments (509) the column and checks (510) if there are any further columns to be computed. If there are further columns to be computed, the CPU 103 computes (511) memo1 incrementally. The CPU 103 may compute memo1 by subtracting the leftmost column-wise sum (memoData1) of the previous window from memo1 and adding the new column-wise sum to get the Total Wallis window sum. The CPU 103 further computes (512) memo2 incrementally. The CPU 103 may compute memo2 by subtracting the leftmost column-wise sum of squares (memoData2) of the previous window from memo2 and adding the new column-wise sum to get the Total Wallis window sum of squares. The various actions in method 500 may be performed in the order presented, in a different order or simultaneously. Further, in some embodiments, some actions listed in FIGS. 5*a* and 5*b* may be omitted.

Embodiments disclosed herein are linear in complexity O(n) where n is the number of pixels in the image, and the performance is invariant with Wallis window sizes. Embodiments disclosed herein use a minimal additional memory to remember the already solved sub-problems (column-wise sum of values and column-wise sum of squares of values). Embodiments disclosed herein do not have any specific hardware requirements and is independent of the number of cores in the computing device and hence runs efficiently on a low end computing device as well.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for enhancing local contrast of an image in a GIS (Geographic Information System) application, the method comprising
    computing column-wise sum for all pixels in the $0^{th}$ row up to extent of a Wallis window for the $0^{th}$ row;
    storing the computed column-wise in memodata1;
    computing column-wise sum of squares for all pixels in the $0^{th}$ row up to extent of the Wallis window for the $0^{th}$ row;
    storing the computed column-wise in memodata2;
    computing new pixel colours of the $0^{th}$ row using horizontal memoization;
    computing column-wise sum for all pixels in next row incrementally, on incrementing the row;
    computing column-wise sum of squares for all pixels in next row incrementally, on incrementing the row; and
    computing new pixel colours of each row using horizontal memoization, till all rows are completed.

2. The method, as claimed in claim 1, wherein computing new pixel colours using horizontal memorization comprising
    computing total Wallis sum by adding all column-wise sums of memodata1 for the $0^{th}$ column up to extent of a Wallis window for the $0^{th}$ column;
    storing the total Wallis sum in memo1;
    adding total Wallis sum of squares by adding all column-wise sum of squares of memodata2 for the $0^{th}$ column up to extent of the Wallis window for the $0^{th}$ column;
    storing the total Wallis sum of squares in memo2;
    computing mean as mean=memo1/Windowsize;

computing standard deviation as

StdDev=Sqrt((memo2−mean*mean*WindowSize)/(WindowSize−1));

compute pixel colour using Wallis formula as

Color(Row, Col)=Wallis(mean, StdDev, Color(Row, Col));

computing memo1 for next column incrementally, on incrementing the column;

computing memo2 for next column incrementally, on incrementing the column; and computing mean, standard deviation and pixel colour for each column, till all columns are completed.

3. The method, as claimed in claim 2, wherein computing memo1 for the next column incrementally comprises of removing left most column-wise sum from memodata1 of Wallis window of previous column from memo1; and adding right most column-wise sum from memodata1 of the Wallis window of the next column into memo1.

4. The method, as claimed in claim 2, wherein computing memo2 for the next column incrementally comprises of removing left most column-wise sum of squares from memodata2 of the Wallis window of previous column from memo2; and adding right most column-wise sum of squares from memodata2 of Wallis window of the next column into memo2.

5. The method, as claimed in claim 1, wherein computing column-wise sum for all pixels in the next row incrementally comprises of removing top most row of Wallis window of previous row from memodata1; and adding a new row into memodata1, wherein the new row is the last row of the Wallis window of the current column.

6. The method, as claimed in claim 1, wherein computing column-wise sum of squares for all pixels in the next row incrementally comprises of removing top most row of Wallis window of previous row from memodata2; and adding a new row into memodata2, wherein the new row is the last row of the Wallis window of the current column.

7. A GIS (Geographic Information System) system comprising of a GIS application, the GIS application configured for enhancing local contrast of an image in a GIS application by computing column-wise sum for all pixels in the $0^{th}$ row up to extent of a Wallis window for the $0^{th}$ row;

storing the computed column-wise in memodata1;

computing column-wise sum of squares for all pixels in the $0^{th}$ row up to extent of the Wallis window for the $0^{th}$ row;

storing the computed column-wise in memodata2;

computing new pixel colours of the $0^{th}$ row using horizontal memoization;

computing column-wise sum for all pixels in next row incrementally, on incrementing the row;

computing column-wise sum of squares for all pixels in next row incrementally, on incrementing the row; and computing new pixel colours of each row using horizontal memoization, till all rows are completed.

8. The system, as claimed in claim 7, wherein the system is configured for computing new pixel colours using horizontal memorization by computing total Wallis sum by adding all column-wise sums of memodata1 for the $0^{th}$ column up to extent of a Wallis window for the $0^{th}$ column;

storing the total Wallis sum in memo1;

adding total Wallis sum of squares by adding all column-wise sum of squares of memodata2 for the $0^{th}$ column up to extent of the Wallis window for the $0^{th}$ column;

storing the total Wallis sum of squares in memo2;

computing mean as mean=memo1/Windowsize;

computing standard deviation as

StdDev=Sqrt((memo2−mean*mean*WindowSize)/(WindowSize−1));

compute pixel colour using Wallis formula as

Color(Row, Col)=Wallis(mean, StdDev, Color(Row, Col));

computing memo1 for next column incrementally, on incrementing the column;

computing memo2 for next column incrementally, on incrementing the column; and computing mean, standard deviation and pixel colour for each column, till all columns are completed.

9. The system, as claimed in claim 8, wherein the system is configured for computing memo1 for the next column incrementally by removing left most column-wise sum from memodata1 of Wallis window of previous column from memo1; and adding right most column-wise sum from memodata1 of the Wallis window of the next column into memo1.

10. The system, as claimed in claim 8, wherein the system is configured for computing memo2 for the next column incrementally by removing left most column-wise sum of squares from memodata2 of the Wallis window of previous column from memo2; and adding right most column-wise sum of squares from memodata2 of Wallis window of the next column into memo2.

11. The system, as claimed in claim 7, wherein the system is configured for computing column-wise sum for all pixels in the next row incrementally by removing top most row of Wallis window of previous row from memodata1; and adding a new row into memodata1, wherein the new row is the last row of the Wallis window of the current column.

12. The system, as claimed in claim 7, wherein the system is configured for computing column-wise sum of squares for all pixels in the next row incrementally by removing top most row of Wallis window of previous row from memodata2; and adding a new row into memodata2, wherein the new row is the last row of the Wallis window of the current column.

* * * * *